(12) United States Patent
Sasaki (10) Patent No.: US 11,858,315 B2
(45) Date of Patent: Jan. 2, 2024

(54) DEFOGGING DEVICE

(71) Applicant: ASAHI KASEI KABUSHIKI KAISHA, Tokyo (JP)

(72) Inventor: Hiroyuki Sasaki, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 414 days.

(21) Appl. No.: 16/649,194

(22) PCT Filed: Sep. 5, 2018

(86) PCT No.: PCT/JP2018/032920
§ 371 (c)(1),
(2) Date: Mar. 20, 2020

(87) PCT Pub. No.: WO2019/065133
PCT Pub. Date: Apr. 4, 2019

(65) Prior Publication Data
US 2020/0269660 A1 Aug. 27, 2020

(30) Foreign Application Priority Data
Sep. 26, 2017 (JP) .................................. 2017-185361

(51) Int. Cl.
*B60H 1/34* (2006.01)
*B60S 1/54* (2006.01)
*G01N 21/17* (2006.01)

(52) U.S. Cl.
CPC .............. *B60H 1/3407* (2013.01); *B60S 1/54* (2013.01); *G01N 21/17* (2013.01); *B60H 2001/3485* (2013.01); *G01N 2021/1731* (2013.01)

(58) Field of Classification Search
CPC .......... B60H 1/3407; B60H 2001/3485; B60H 1/00785; B60H 2001/3245; B60S 1/54;
(Continued)

(56) References Cited

U.S. PATENT DOCUMENTS

| 5,873,256 A * | 2/1999 | Denniston .......... B60H 1/00414 |
| | | 62/271 |
| 6,092,375 A * | 7/2000 | Denniston .............. B64D 13/00 |
| | | 62/271 |

(Continued)

FOREIGN PATENT DOCUMENTS

| CN | 104114388 A | * 10/2014 | ......... B60H 1/00742 |
| EP | 1844964 A2 | * 10/2007 | ......... B60H 1/00785 |

(Continued)

OTHER PUBLICATIONS

International Search Report (with partial translation) and Written Opinion issued in corresponding International Patent Application No. PCT/2018/032920, dated Dec. 4, 2018.

(Continued)

*Primary Examiner* — Mohamed K Amara
(74) *Attorney, Agent, or Firm* — Morgan, Lewis & Bockius LLP (57) ABSTRACT

A defogging device includes a temperature sensor, an infrared sensor, a surface temperature measuring unit, a humidity sensor, a dew point temperature measuring unit, and a fogging/dew condensation determining unit. When the defogging device is instructed to perform measurement, the temperature sensor measures temperature. Additionally, measurement by the infrared sensor is performed, and based on an output of the infrared sensor and an output of the temperature sensor, the surface temperature measuring unit measures glass surface temperature. Measurement by the humidity sensor is performed, and based on an output of the humidity sensor and the output of the temperature sensor, the dew point temperature measuring unit measures dew point temperature. Lastly, the fogging/dew condensation determining unit compares the glass surface temperature with the (Continued)

dew point temperature to determine whether fogging or dew condensation occurs or not.

10 Claims, 3 Drawing Sheets

(58) Field of Classification Search
CPC .. B60S 1/02; G01N 21/17; G01N 2021/1731; G01J 5/00; F24F 11/30; F24F 2110/20; F24F 6/00
See application file for complete search history.

(56) References Cited

U.S. PATENT DOCUMENTS

| | | | |
|---|---|---|---|
| 6,422,062 B1 | 7/2002 | King et al. | |
| 7,416,331 B2 | 8/2008 | Ruttiger et al. | |
| 7,918,100 B2 * | 4/2011 | Breed | F24F 11/30 |
| | | | 165/203 |
| 8,301,335 B2 * | 10/2012 | Hill | G05B 13/021 |
| | | | 62/150 |
| 10,752,215 B2 * | 8/2020 | Wang | B60S 1/0818 |
| 2005/0045322 A1 * | 3/2005 | Yoshida | B60H 1/3207 |
| | | | 236/44 C |
| 2005/0073396 A1 * | 4/2005 | Mills | B60Q 9/008 |
| | | | 701/45 |
| 2006/0000597 A1 * | 1/2006 | Errington | B60H 1/00814 |
| | | | 165/204 |
| 2006/0004494 A1 * | 1/2006 | Errington | B60H 1/00785 |
| | | | 701/1 |
| 2006/0063120 A1 | 3/2006 | Barlian et al. | |
| 2006/0203879 A1 | 9/2006 | Ruttiger et al. | |
| 2006/0207325 A1 | 9/2006 | Kataoka et al. | |
| 2006/0289458 A1 * | 12/2006 | Kim | H05B 1/0236 |
| | | | 219/497 |
| 2007/0235549 A1 * | 10/2007 | Nakajima | B60H 1/00864 |
| | | | 236/44 R |
| 2008/0066477 A1 * | 3/2008 | Aoki | G05D 23/19 |
| | | | 236/44 A |
| 2008/0168785 A1 | 7/2008 | Sauer et al. | |
| 2009/0039170 A1 | 2/2009 | Burns et al. | |
| 2010/0140366 A1 | 6/2010 | Burns et al. | |
| 2010/0297925 A1 | 11/2010 | Burns et al. | |
| 2015/0017900 A1 * | 1/2015 | Baek | B60S 1/023 |
| | | | 454/75 |
| 2015/0105976 A1 * | 4/2015 | Shikii | B60H 1/00742 |
| | | | 701/36 |
| 2017/0106721 A1 * | 4/2017 | Hoke | B60H 1/0073 |
| 2018/0265043 A1 * | 9/2018 | Salter | B60H 1/00785 |
| 2019/0084381 A1 * | 3/2019 | Daniel | B60H 1/32331 |
| 2020/0101941 A1 * | 4/2020 | Sasaki | G01N 27/045 |

FOREIGN PATENT DOCUMENTS

| | | | | |
|---|---|---|---|---|
| JP | S63-019455 U | 2/1988 | | |
| JP | H05-294139 A | 11/1993 | | |
| JP | 2004-066927 A | 3/2004 | | |
| JP | 2005-238921 A | 9/2005 | | |
| JP | 2005-531776 A | 10/2005 | | |
| JP | 2007-505302 A | 3/2007 | | |
| JP | 2007-145214 A | 6/2007 | | |
| JP | 2009-040403 A | 2/2009 | | |
| JP | 2009-519858 A | 5/2009 | | |
| JP | 2011-068157 A | 4/2011 | | |
| JP | 2018118529 A * | 8/2018 | | B60H 1/00 |
| WO | WO-2019039308 A1 * | 2/2019 | | B60H 1/00271 |

OTHER PUBLICATIONS

International Preliminary Report on Patentability dated Mar. 31, 2020, issued in corresponding International Patent Application No. PCT/JP2018/032920.

* cited by examiner

DEFOGGING DEVICE

TECHNICAL FIELD

The present invention relates to a defogging device configured to prevent the occurrence of fogging and dew condensation.

BACKGROUND ART

Conventionally, defogging devices (anti-fogging devices) are known for preventing fogging or dew condensation from occurring on windshield glass or the like of motor vehicles by measuring surface temperature of an object. Usually, fogging or dew condensation occurs when surface temperature of an object is lower than dew point temperature of a space (in general, air) near the object. On the other hand, the dew point temperature can be obtained from measured values obtained by measuring temperature and relative humidity of the space. In the defogging devices, it is most common to adjust using any air conditioning device or the like such that the surface temperature of the object does not become lower than the dew point temperature.

The adjustment operation by a defogging device is basically performed under automatic control, and is applicable particularly to a state where the occurrence of fogging or dew condensation is inconvenient even if only for a moment. A most typical specific example is application to windshield glass of a motor vehicle. In the case of the windshield glass of a motor vehicle, it is basically impossible to allow a situation where visibility cannot be secured due to fogging or dew condensation. Accordingly, when in actual use, it is common to make an adjustment for defogging even when the surface temperature of an object is higher by some degrees Celsius (not 0° C.) than dew point temperature, instead of adjusting such that the surface temperature of the object does not become lower than the dew point temperature, as described above.

CITATION LIST

Patent Literature

PTL 1: JP S63-19455 U
PTL 2: JP 2005-531776 A
PTL 3: JP 2011-68157 A

SUMMARY OF INVENTION

Technical Problem

PTL 1 to PTL 3 disclose technologies that apply, to the windshield glass of a motor vehicle, a principle of the method of adjusting using any air conditioning device or the like such that the surface temperature of an object does not become lower than dew point temperature.

First, PTL 1 describes a technology that increases temperature by blowing heated air from a heater onto glass, assuming that dew condensation can occur when dew point temperature approaches a state of being lower by 3° C. than glass temperature.

In PTL 2, it is described that use of a contactless type temperature sensor, particularly, an infrared sensor is effective in measuring glass temperature. Additionally, it also describes a technology that dries air near the glass, assuming that dew condensation can occur if dew point temperature approaches a state of being lower by 5° C. than glass temperature.

PTL 3 describes a technology that determines an air conditioning control method by defining a fogging level predicted value as a parameter corresponding to a difference between dew point temperature and glass temperature appearing in common in PTL 1 and PTL 2, and then comparing the fogging level predicted value with a defogging determination value. The defogging determination value defined in PTL 3 is described to be 85%. The numerical value corresponds to about 3° C. if converted to the difference between dew point temperature and glass temperature.

All the three pieces of PTL 1 to 3 perform an adjustment for defogging even in a situation where the surface temperature of an object (the surface temperature of the glass) is higher than dew point temperature by 3° C. or more and, ideally, neither fogging nor dew condensation can occur. In other words, although there is no risk of fogging, an air conditioning device such as an air conditioner or defroster will be operated for defogging. This directly leads to excessive use of air conditioning energy. For example, in the case of motor vehicles, particularly, in hybrid vehicles (PHEV) and electric vehicles (EV), there are negative effects, such as reduced gas mileage (electric mileage) and reduced cruising distance.

In the conventional technologies, the reason that, as described above, defogging adjustment must be started under conditions stricter than those under which fogging or dew condensation actually occurs can be roughly classified into the following two points.

The first point is due to the fact that a place where temperature and humidity, respectively, are measured is located at some distance away from a place where fogging or dew condensation occurs. When considering a situation in a motor vehicle, particularly, temperature of the windshield glass is significantly different between an upper portion and a lower portion with an outlet. Additionally, humidity in the air in the vehicle is significantly different between near the glass and near the driver's seat. However, although such a situation sometimes occurs, it can be relatively easily solved by optimizing the place where temperature and humidity, respectively, are measured.

The second point is due to the fact that respective measured values of the temperature and humidity are considered to include an error. For example, assume that, as the error in the respective measured values of the temperature and the humidity, there are an error of ±1° C. in the surface temperature of the object, an error of ±1° C. in air temperature, and an error of ±3° C. in air humidity. Then, in a worst case, even if a measured dew point temperature value is lower by 3° C. than the surface temperature of the object, true value of the surface temperature of the object becomes lower than true value of the dew point temperature. In this case, fogging or dew condensation occurs even under ideal conditions.

In other words, it can be said that defogging adjustment is started under conditions stricter than the conditions under which fogging or dew condensation actually occurs, by setting of a so-called margin for preventing fogging or dew condensation from occurring due to the difference between the place where the temperature and humidity are measured and the place where fogging or dew condensation occur and the errors included in the measured temperature and humidity values.

It is an object of the present invention to provide a defogging device capable of further reducing air conditioning energy consumption by setting the margin to a minimum set value using a new control method in order to improve fuel efficiency or cruising distance of motor vehicles, particularly, of electric vehicles.

Solution to Problem

In order to achieve the above object, according to an aspect of the present invention, there is provided a defogging device configured to perform control for preventing fogging or dew condensation in accordance with a comparison result between surface temperature of an object and dew point temperature, the defogging device including: a surface temperature measuring unit configured to measure the temperature of the object on a basis of an amount of infrared light emitted from the object and a temperature of a device configured to measure the amount of infrared light; and a dew point temperature measuring unit configured to detect the dew point temperature on a basis of temperature and humidity of an ambient environment of the object, wherein a sensor configured to detect the temperature of the device configured to measure the amount of infrared light and a sensor configured to measure the temperature of the ambient environment of the object have a characteristic that a measurement error included in an output of the sensor configured to detect the temperature of the device configured to measure the amount of infrared light is coincident with a measurement error included in an output of the sensor configured to measure the temperature of the ambient environment of the object.

According to another aspect of the present invention, there is provided a defogging device including: an infrared sensor configured to measure an amount of infrared light emitted from an object; a temperature sensor configured to measure temperature of an ambient environment of the object; a humidity sensor configured to measure humidity of the ambient environment of the object; a surface temperature detecting unit configured to detect surface temperature of the object on a basis of the amount of infrared light measured by the infrared sensor and the temperature measured by the temperature sensor; a dew point temperature measuring unit configured to detect dew point temperature on a basis of the temperature measured by the temperature sensor and the humidity measured by the humidity sensor; and a control unit configured to perform control for preventing fogging or dew condensation in accordance with a comparison result between the surface temperature detected by the surface temperature detecting unit and the dew point temperature detected by the dew point temperature measuring unit, the temperature sensor is common between the surface temperature detecting unit and the dew point temperature measuring unit.

Advantageous Effects of Invention

According to the one aspect of the present invention, conditions under which fogging or dew condensation cannot occur can be more precisely set, and performing air conditioning control according to the conditions can stop use of air conditioning energy by an amount corresponding to that. This can overwhelmingly reduce air conditioning energy consumption, such as particularly large amounts of air conditioning energy that have been conventionally used by electric vehicles.

DESCRIPTION OF EMBODIMENTS

In the following detailed description, lots of specific and concrete configurations will be described to provide complete understanding of embodiments of the present invention. However, it would be apparent that other embodiments can be carried out without being limited to such specific and concrete configurations. Further, the following embodiments do not limit the invention according to the claims, but include all combinations of characteristic configurations described in the embodiments.

Referring to the drawings, an embodiment of the present invention will be described. In the description of the drawings, the drawings are schematic.

(Structure of Embodiment)

Figure 1:
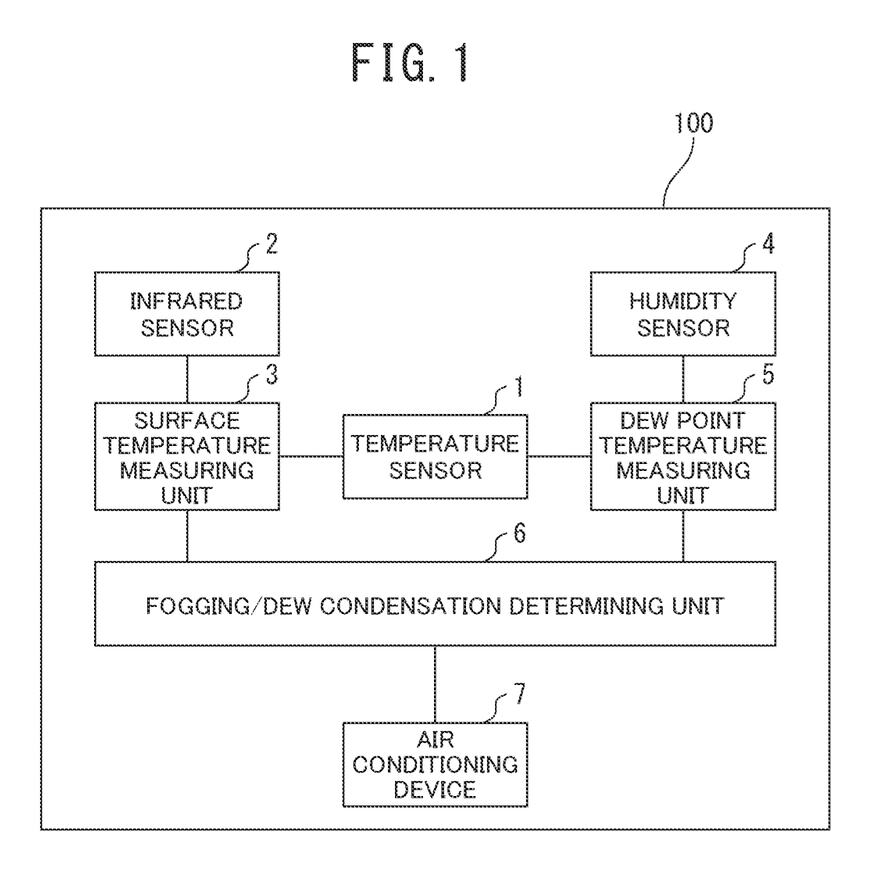
FIG. 1 is a schematic structural diagram illustrating one example of a defogging device according to one embodiment of the present invention.

FIG. 1 is a block diagram illustrating a structural example of a defogging device 100 according to one embodiment of the present invention.

In FIG. 1, reference sign 1 denotes a temperature sensor. The temperature sensor 1 may be of a mercury columnar type or the like for use in an ordinary, so-called thermometer or the like. However, in the defogging device 100 according to the one embodiment of the present invention, a compact semiconductor sensor, such as a thermocouple or a thermistor, is optimal from the viewpoint of occupied area.

Reference sign 2 denotes an infrared sensor. The infrared sensor 2 receives infrared light and outputs a signal V corresponding to an amount of the received light. The signal V becomes larger as the amount of the received light increases. The wavelength band of the infrared sensor 2 is set to about from 5 μm to 15 μm, similarly to an ordinary radiation thermometer. This is because the environmental average temperature is about from 15° C. to 25° C., and accordingly, the light received by the infrared sensor 2 has a peak wavelength of about 10 μm according to the Wien's displacement law.

Reference sign 3 denotes a surface temperature measuring unit. Specifically, the surface temperature measuring unit 3 is a block configured to contactlessly measure the surface temperature of an object that is to be defogged by the defogging device 100. Hereinafter, as a typical example of the object that is to be defogged by the defogging device 100, the object is assumed to be glass, particularly, the windshield glass of a motor vehicle. Note that the object is not limited to the windshield glass of a motor vehicle, and the present invention is applicable to any object where fogging or dew condensation occurs.

Additionally, in general, to contactlessly measure the temperature of an object by using the infrared sensor 2, temperature of the infrared sensor 2 itself is also needed. The present embodiment assumes that the temperature of the infrared sensor 2 is measured by the temperature sensor 1. Note that the temperature sensor 1 is not only used by the surface temperature measuring unit 3. Details will be described later.

The surface temperature measuring unit 3 detects the temperature of the object, i.e., the temperature of the windshield glass on the basis of the infrared output V including the signal corresponding to the amount of the received light output from the infrared sensor 2 and an output of the temperature sensor 1.

Reference sign 4 denotes a humidity sensor. The humidity sensor 4 may be of an ordinary, so-called wet and dry bulb type or the like. However, in the present embodiment, a compact sensor, such as a capacitance type or resistance type sensor, is optimal from the viewpoint of occupied area.

Reference sign 5 denotes a dew point temperature measuring unit. In general, dew point temperature can be obtained from environmental temperature and relative humidity. Accordingly, first, to measure relative humidity, the humidity sensor 4 is used.

On the other hand, the temperature sensor 1 configured to measure environmental temperature in the present embodiment is the same (common) one as that used in the surface temperature measuring unit 3. In other words, the temperature sensor 1 for measuring the temperature of the infrared sensor 2 itself is also used as the temperature sensor for measuring the environmental temperature.

Here, conventionally, the temperature sensor used in the surface temperature measuring unit 3 has been completely different from the temperature sensor used in the dew point temperature measuring unit 5. In other words, two temperature sensors have been used.

On the other hand, the present embodiment uses only one temperature sensor. This allows space saving and cost reduction, and actually, provides much greater effect. Details about this will be described later.

Reference sign 6 denotes a fogging/dew condensation determining unit. In general, a determination on fogging or dew condensation is made by comparing glass surface temperature and dew point temperature, and this principle is also applied to the present embodiment. The fogging/dew condensation determining unit 6 controls an air conditioning device 7 in accordance with results of the comparison between the glass surface temperature and the dew point temperature to perform control for preventing fogging or dew condensation. The air conditioning device 7 is, for example, an air conditioner, a defroster, or the like configured to supply adjusted air to an object that is to be controlled, i.e., to the windshield glass or to an ambient environment of the object, i.e., into a cabin of the vehicle.

Figure 2:
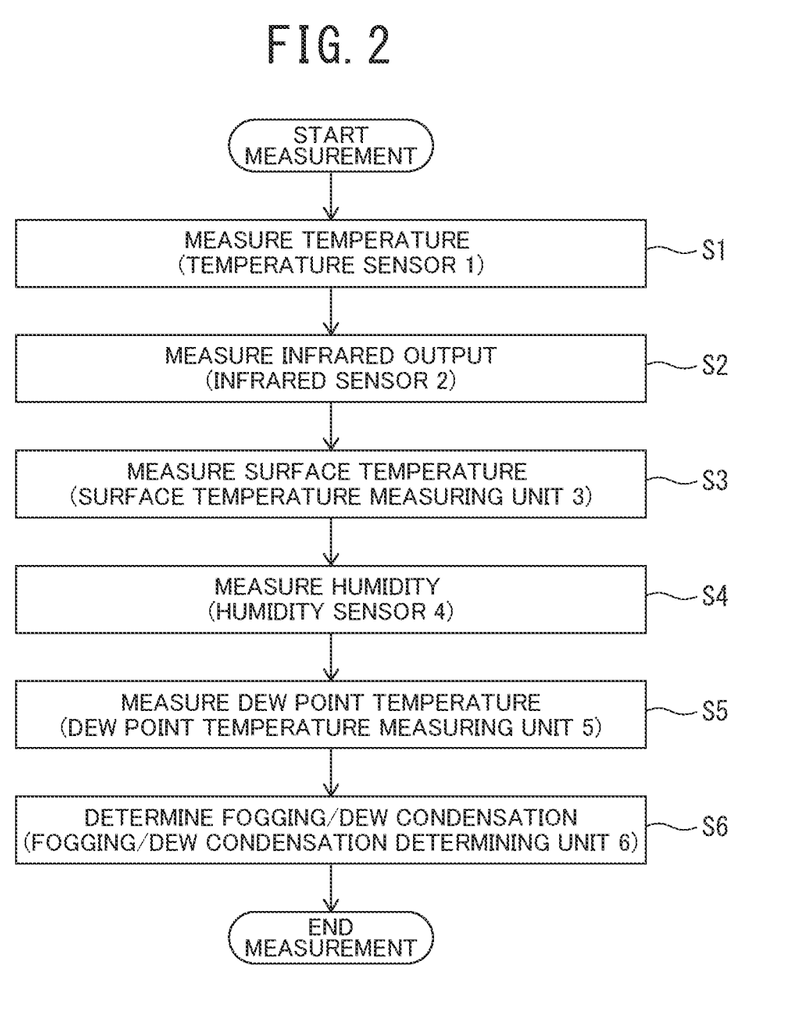
FIG. 2 is a flowchart illustrating one example of a processing procedure by the defogging device.

FIG. 2 is a flowchart illustrating operation of each block in the defogging device 100 illustrated in FIG. 1. The flowchart illustrated in FIG. 2 is one example of a system in which only single step processing is allowed, and the processing illustrated in FIG. 2 can also be applied to a system in which parallel processing is allowed. Additionally, it is also possible to apply cases where the order of respective steps in the flowchart illustrated in FIG. 2 is reversed.

When an operator or the like instructs start of measurement, the defogging device 100 first performs temperature measurement by using the temperature sensor 1 (step S1). In the temperature measurement, there is no information to be input to the temperature sensor 1, and output information is temperature. The temperature output from the temperature sensor 1 is designated as Tr.

Next, using the infrared sensor 2, the amount of infrared light output from the windshield glass is measured (step S2). There is no information input to the infrared sensor 2, and output information is the infrared output V.

Subsequently, the surface temperature measuring unit 3 measures glass surface temperature (step S3). The surface temperature measuring unit 3 actually calculates a glass surface temperature Tb from the temperature Tr measured at step S1 and the infrared output V measured at the step S2, which are pieces of input information at this step, and outputs the glass surface temperature Tb. The simplest example of a calculation formula for the glass surface temperature Tb can be represented by the following formula:

$$Tb = V/b + Tr$$

Note that "b" in the formula represents a coefficient corresponding to sensitivity of the infrared sensor 2, which is a coefficient given in advance before starting the processing illustrated in FIG. 2.

Furthermore, using the humidity sensor 4, environmental relative humidity is measured (step S4). There is no information input to the humidity sensor 4, and output information is a relative humidity Hr.

Subsequently, the dew point temperature measuring unit 5 measures environmental dew point temperature (step S5). The dew point temperature measuring unit 5 actually calculates a dew point temperature Td from the temperature Tr measured at step S1 and the relative humidity Hr measured at step S4, which are pieces of input information at this step, and outputs the dew point temperature Td. An example of calculation of the dew point temperature will be itemized below:

(1) First, the amount of saturated water vapor is obtained from the temperature Tr. The amount of saturated water vapor may be calculated using, for example, Tetens' formula;

(2) Next, environmental absolute humidity is obtained by multiplying the amount of saturated water vapor obtained in (1) by the relative humidity Hr; and (3) Next, a temperature at which the absolute humidity obtained in (2) becomes the amount of saturated water vapor is found. The temperature found here is exactly the dew point temperature Td.

Note that an actual calculation example using specific numerical values of temperature and humidity will be described in detail in the section of "effects" described later.

Lastly, the glass surface temperature Tb is compared with the dew point temperature Td (step S6). As the comparing method, if the surface temperature Tb of the glass (in general, an object) is higher than dew point temperature Td (Tb>Td), fogging or dew condensation does not occur. On the other hand, a theory (ideal environment) that if Tb≤Td, fogging or dew condensation occurs is a major premise. Considering an error or the like that occurs in an actual operation with respect to the major premise leads to the setting of the margin (3° C. or 5° C.) as described in the conventional technologies.

Next, two conventional methods will be compared with the method of the present invention described above to clarify effects of the one embodiment of the present invention.

(First Conventional Method)

In a first conventional method, measurement of glass surface temperature is performed by, instead of an infrared sensor, attaching a semiconductor sensor substantially the same as the temperature sensor 1 in the present embodiment in such a manner as to contact with glass. PTL 1 and PTL 3 described in the conventional technologies use this method. Additionally, a part of PTL 2 is also included in this case.

Assume that the true value of environmental temperature is 25° C., and the true value of environmental humidity is 40% RH. Dew point temperature in this case is obtained according to the above-described typical calculation example, and results become as follows:

(1) The amount of saturated water vapor at a temperature of 25° C. is 23.0 g/m³.

(2) Thus, the absolute humidity of the relative humidity 40% RH is 9.2 g/m³.

(3) The temperature at which 9.2 g/m³ becomes the amount of saturated water vapor is 9.7° C.

Accordingly, the dew point temperature is 9.7° C. In other words, as a theoretical result, when the true value of glass temperature is lowered to 9.7° C., fogging or dew condensation starts to occur.

Here, respective errors of the measured temperatures and relative humidity in this case are set as below. These errors may be considered substantially standard values, as described in the section of the conventional technologies, PTL 1 to 3, and the like.

Environmental temperature error: ±1° C.
Environmental humidity error: ±2% RH
Glass temperature error: ±1° C.

In other words, it is indicated that even if the true values are 25° C. and 40% RH, measured values with error may be 24° C. and 38% RH. In this case, the dew point temperature calculated in exactly the same way is 8.2° C. On the other hand, even if the true value of glass temperature is 9.7° C., a measured value with error may be 10.7° C.

Here, again, in view of the method for determining fogging or dew condensation, a comparison may be made between levels of the glass temperature and the dew point temperature, as described above. Accordingly, in the case of the first conventional method, it is appropriate to determine that fogging or dew condensation has already occurred at the dew point temperature lower by 2.5° C. than the glass temperature, even only considering the above-described limited actual example as a determination in consideration of errors. To put it the other way around, it is proof that the errors (such as 3° C.) in the conventional technologies have been very carefully set.

Additionally, the first conventional method also includes a case where, when measuring dew point temperature, absolute humidity is directly measured without going through the measurement of relative humidity. This is because an element that directly measures the absolute humidity is equivalent to the fact that a thermometer, separately from other thermometer(s), is included in an element that measures absolute humidity. The same also applies to the following second conventional method, but does not apply to the method according to the one embodiment of the present invention.

(Second Conventional Method)

The second conventional method is a case where an infrared sensor is used for calculation of glass surface temperature measurement.

Furthermore, it is also a case where, unlike the one embodiment of the present invention, a temperature sensor configured to measure temperature of the infrared sensor is completely different from a temperature sensor configured to perform temperature measurement for calculation of dew point temperature measurement. In other words, it is a comparison with the case where two temperature sensors are included. PTL 2 described in the conventional technologies corresponds to this case.

In this case, temperature and humidity to be measured and errors thereof are set as below. The errors follow those in the first conventional method.

Environmental temperature error: ±1° C.
Environmental humidity error: ±2% RH
Infrared sensor temperature error: ±1° C.
Infrared sensor output error: (a sensor output value corresponding to) ±1° C.

To be more specific about the set values, the environmental temperature and humidity (dew point temperature) error is not different from that in the first method. On the other hand, when considering glass temperature error, both an error that occurs when measuring the temperature of the infrared sensor itself and an error in an output value of the infrared sensor, respectively, independently occur since the infrared sensor is used for the measurement of glass temperature. Accordingly, the mechanism of occurrence of error is different from that in the first conventional method, so that it is necessary to consider again the method for calculating a theoretical value of glass temperature.

As described in the above illustration of FIG. 2, the simplest example of the calculation formula in the measurement of surface temperature can be represented by the following formula (1):

$$Tb = V/b + Tr \qquad (1)$$

Accordingly, since fogging or dew condensation starts to occur when the true value Tb of the glass temperature is lowered to 9.7° C., respective terms on the right side of formula (1) may be considered to be measured as follows: the temperature Tr of the infrared sensor itself is 25° C. and the temperature V/b corresponding to infrared sensor output is −15.3° C.

A typical case where the above numerical conditions are satisfied is a case where the infrared sensor 2, the humidity sensor 4, and the temperature sensor 1 are all present in the same space and in close vicinity. On the other hand, if any one of the above three sensors is in a different space or in a remote place, the numerical conditions are not satisfied.

On the other hand, the above error set values and the values of the respective terms of formula (1) correspond to each other as follows:

Infrared sensor temperature error±1° C.: error of Tr in formula (1)
Infrared sensor output error±1° C.: error of V/b in formula (1)

Accordingly, in a worst case, the measured values may be Tr=26° C. and V/b=−14.3° C. In other words, the glass temperature with error is calculated to be 11.7° C. When this is compared with the above-mentioned dew point temperature (8.2° C.), a determination has to be made that fogging or dew condensation has occurred as early as when the temperature has been lower by 3.5° C. The large margin (5° C.) in PTL 2 seems to be a value set in consideration of such a situation.

(Method According to One Embodiment of the Present Invention)

The error values in the method according to the one embodiment of the present invention naturally shall follow those in the two methods according to the conventional technologies. Furthermore, characteristics regarding the errors in the method according to the one embodiment of the present invention are added, and the error values are set as follows:

Environmental temperature error: ±1° C., which has the same error value as that of the infrared sensor temperature.
Environmental humidity error: ±2% RH
Infrared sensor temperature error: ±1° C., which has the same error value as that of the environmental temperature.
Infrared sensor output error: a sensor output value corresponding to ±1° C.

Regarding dew point temperature in this case, obviously, the dew point temperature with error with respect to the true value of 9.7° C. is 8.2° C., which is the same as that in the two methods of the conventional technologies.

However, in the glass temperature measurement, the circumstances are significantly different between the method according to the one embodiment of the present invention and the two methods according to the conventional technologies. This is because the method according to the one embodiment of the present invention uses the temperature of the same, i.e., common temperature sensor 1, and therefore, the infrared sensor temperature error is completely the same as the environmental temperature error. In other words, although the infrared sensor temperature with error has been assumed to be 26° C., which is common between the two methods of the conventional technologies, the method according to the one embodiment of the present invention does not have to assume it to be 26° C., and can set it to 24° C. By adding to this an infrared sensor output with error of "from −16.3° C. to −14.3° C.", the glass temperature measured value with error is calculated to be in a range of "from 7.7° C. to 9.7° C.".

Here, when comparing the levels of the glass temperature and the dew point temperature in order to determine fogging or dew condensation, a determination can be made that fogging or dew condensation has occurred only after the dew point temperature has become lower by 1.5° C. than the glass temperature even in a worst case. In other words, applying the method according to the one embodiment of the present invention allows the margin to be reduced by 1° C. as compared with 2.5° C. in the first conventional method and by 2° C. as compared with 3.5° C. in the second conventional method.

Using the above numerals, a description based on an actual air conditioning system of a motor vehicle will be given as follows.

Assume that, in a vehicle cabin of the motor vehicle, dew point temperature is lower by 4° C. than glass surface temperature. In this case, any of the method according to the one embodiment of the present invention, the first conventional method, and the second conventional method does not determine that fogging or dew condensation has occurred, so that it is unnecessary to use the defogging operation, i.e., air conditioning energy such as an air conditioner or a heater in the motor vehicle. However, when the state of being lower by 4° C. is reduced to 3.5° C., it is necessary for at least the second conventional method to start the defogging operation for safety to secure the field of vision of the driver of the motor vehicle. This increases energy used by the air conditioner, the heater, or the like necessary for the defogging operation. Furthermore, when it is reduced to 2.5° C., even the first conventional method needs to perform the defogging operation. However, by applying the method according to the one embodiment of the present invention, it may be reduced to 1.5° C. Accordingly, the energy necessary for the defogging operation can be reduced as compared with the conventional methods.

It can be easily understood from the above comparison that, as a first point, the method of the present invention can be effective by using not a temperature sensor such as a thermocouple but a radiation thermometer using an infrared sensor. Furthermore, as a second point, a further effect can be obtained by using a humidity sensor configured to measure relative humidity instead of directly measuring absolute humidity.

The two effects described here can be obtained by essentially using the temperature sensor 1 for both temperature measurement of an object such as glass and dew point temperature measurement of the space. This principle can be briefly summarized as follows.

In brief, both the calculation for obtaining the surface temperature of an object from an output of the infrared sensor and the calculation for obtaining dew point temperature from relative humidity depend on environmental temperature, which is a temperature measured by the temperature sensor 1 in the one embodiment of the present invention. Furthermore, the surface temperature of the object and the dew point temperature are characterized in that both increase as the environmental temperature increases, whereas, conversely, both decrease as the environmental temperature decreases. Moreover, eventually, determination of fogging or dew condensation can be made by merely comparing the surface temperature of the object and the dew point temperature. In other words, it is a relative comparison in which both do not require an absolute value of the measurement, so that even if there is an error in the absolute value of the environmental temperature, it does not excessively affect comparison results. This principle can prevent an increase in the margin, even compared with the first conventional method.

The use of the above principle allows for construction of an air conditioning system that does not require setting of an excessive margin as in the conventional technologies, that is as close to true values as possible, and that does not have to perform any unnecessary defogging operation.

Figure 3:
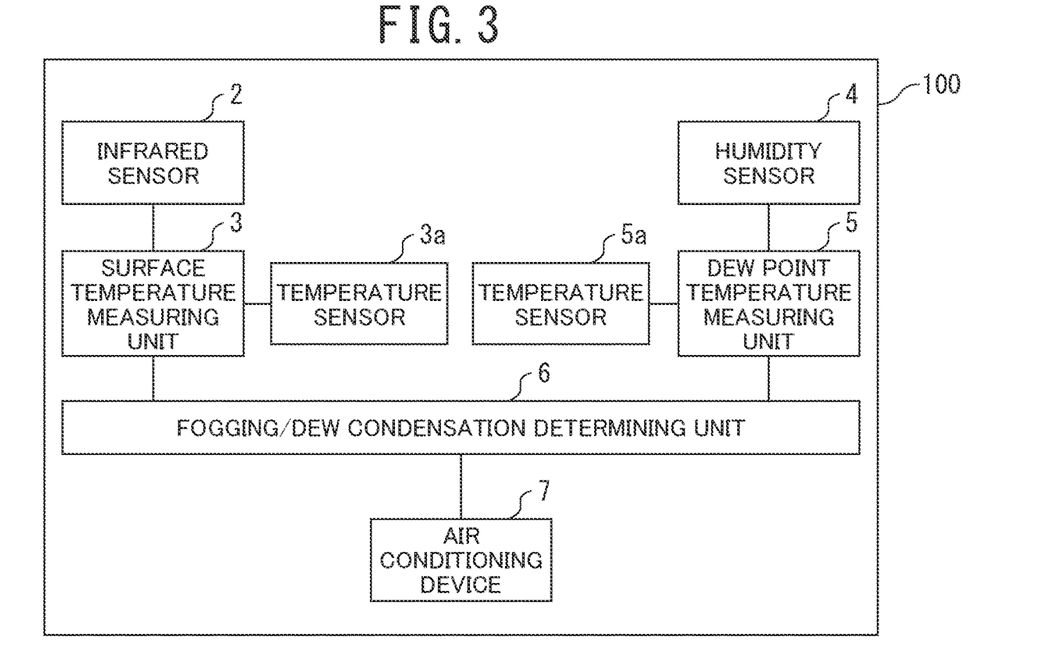
FIG. 3 is a schematic structural diagram illustrating a modification of the defogging device.
Figure 4:
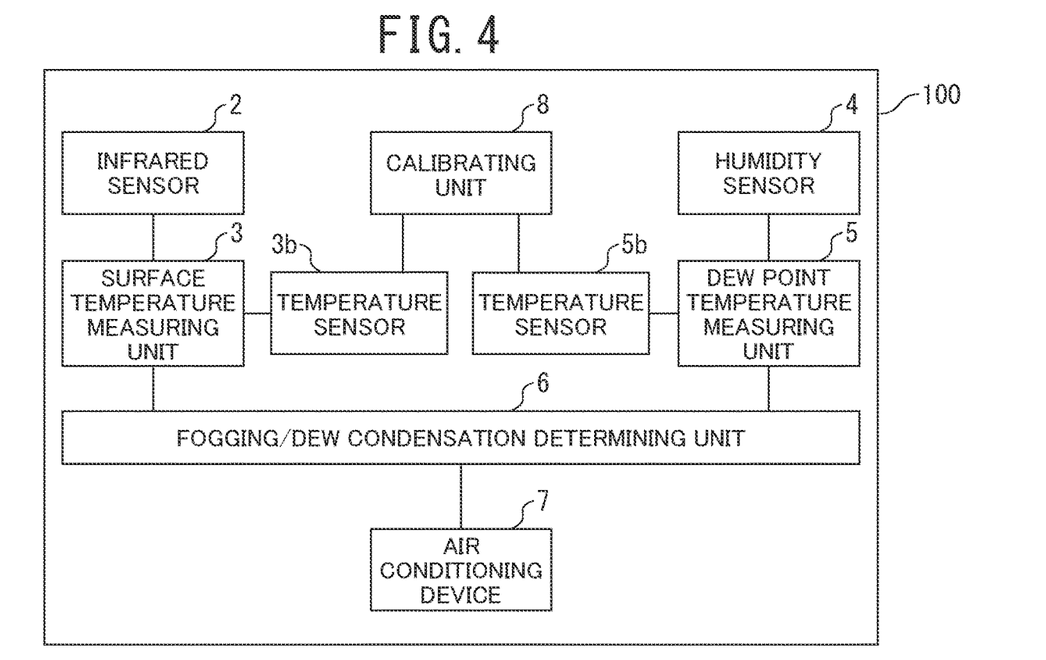
FIG. 4 is a schematic structural diagram illustrating a modification of the defogging device.

Additionally, the above embodiment has described the case where the single temperature sensor 1 is used in common as the temperature sensor used in the surface temperature measuring unit 3, i.e., as a temperature sensor for detecting temperature of the infrared sensor 2 and as the temperature sensor used in the dew point temperature measuring unit 5, i.e., as a temperature sensor for measuring temperature of an ambient environment, so that the measurement errors of the two sensors are coincident, the two sensors being originally necessary. However, the present invention is not limited thereto. For example, as illustrated in FIG. 3, there may be provided a dedicated temperature sensor 3a that is used in the surface temperature measuring unit 3 and a dedicated temperature sensor 5a that is used in the dew point temperature measuring unit 5, which sensors characteristically have the same measurement error. Alternatively, as illustrated in FIG. 4, there may be provided a dedicated temperature sensor 3b that is used in the surface temperature measuring unit 3 and a dedicated temperature sensor 5b that is used in the dew point temperature measuring unit 5, and a calibrating unit 8 may be provided to adjust at least anyone of output characteristics of the temperature sensor 5b and output characteristics of the temperature sensor 3b such that a measurement error included in the output of the temperature sensor 3b coincides with a measurement error included in the output of the temperature sensor 5b. The calibrating unit 8 may perform calibration regularly or at a predetermined time such that the measurement error of the temperature sensor 3b and the measurement error of the temperature sensor 5b coincide with each other.

As a specific method for making the measurement errors coincident by the calibrating unit 8, for example, the following method is conceivable.

The temperature sensor 3b and the temperature sensor 5b before being incorporated in the defogging device 100 are placed in the same temperature environment, and outputs of the temperature sensor 3b and the temperature sensor 5b at that time are obtained to use a difference between both outputs as a calibration value. Then, the calibration value is stored in the calibrating unit 8 of the defogging device 100. When in actual use, the output of the temperature sensor 3b or 5b is increased (or reduced) by an amount corresponding to the calibration value.

In addition, as the temperature sensors 3a and 5a characteristically having the same measurement error, for example, large numbers of temperature sensors 3a and temperature sensors 5a are prepared. Then, there is found a pair of those exhibiting the same temperature value when placed in the same temperature environment. The paired temperature sensors 3a and 5a are regarded as a pair of temperature sensors characteristically having the same measurement error, and the pair of the temperature sensors may be incorporated in the same defogging device 100.

While the embodiments of the present invention have been described hereinabove, the embodiments are those that exemplify devices and methods for embodying the technological idea of the present invention, and the technological idea of the present invention does not specify the materials, shapes, structures, arrangements, and the like of components. The technological idea of the present invention can be variously modified within the technological scope defined by the appended claims.

REFERENCE SIGNS LIST

1: Temperature sensor
2: Infrared sensor
3: Surface temperature measuring unit
4: Humidity sensor
5: Dew point temperature measuring unit
6: Fogging/dew condensation determining unit
8: Calibrating unit
100: Defogging device

The invention claimed is:

1. A defogging device, comprising:
an infrared sensor configured to measure an amount of infrared light emitted from an object;
a temperature sensor configured to measure a temperature of the infrared sensor and to measure a temperature of an ambient environment of the object;
a humidity sensor configured to measure humidity of the ambient environment of the object;
a surface thermometer configured to contactlessly detect a surface temperature of the object on a basis of the amount of infrared light measured by the infrared sensor and the temperature of the infrared sensor measured by the temperature sensor;
a dew point meter configured to detect a dew point temperature of an ambient environment of the object on a basis of the temperature of the ambient environment of the object measured by the temperature sensor and the humidity measured by the humidity sensor; and
a controller configured to perform control for preventing fogging or dew condensation of the object in accordance with a comparison result between the surface temperature detected by the surface thermometer and the dew point temperature detected by the dew point meter, the temperature sensor is common between the surface thermometer and the dew point meter.

2. The defogging device according to claim 1, comprising only one temperature sensor as the temperature sensor.

3. The defogging device according to claim 1, wherein the temperature sensor is provided in contact with or close to the infrared sensor.

4. The defogging device according to claim 1, wherein the humidity sensor is provided in contact with or close to the infrared sensor.

5. The defogging device according to claim 1, wherein the controller includes an air conditioning device configured to supply adjusted air to the object or to the ambient environment of the object.

6. The defogging device according to claim 1, wherein the defogging device is a defroster or an air conditioner in a vehicle, and the object is a windshield glass of the vehicle.

7. The defogging device according to claim 6, wherein the infrared sensor, the temperature sensor, and the humidity sensor are fixed to a rear-view mirror provided in a vehicle cabin of the vehicle.

8. The defogging device according claim 1, wherein the infrared sensor, the temperature sensor, and the humidity sensor are integrated together.

9. The defogging device according claim 1, wherein the defogging device is a defroster or an air conditioner.

10. The defogging device according to claim 1, wherein the temperature sensor is a single common temperature sensor used both to detect the dew point temperature of the ambient environment of the object and to contactlessly detect the surface temperature of the object.

* * * * *